(12) United States Patent
Axmon et al.

(10) Patent No.: US 10,536,870 B2
(45) Date of Patent: Jan. 14, 2020

(54) METHOD FOR HANDLING SIMULTANEOUS MEASUREMENT SIGNALING AND DATA COMMUNICATION, NETWORK NODE, WIRELESS DEVICE, COMPUTER PROGRAMS AND COMPUTER PROGRAM PRODUCTS

(71) Applicant: Telefonaktiebolaget LM Ericsson (publ), Stockholm (SE)

(72) Inventors: Joakim Axmon, Limhamn (SE); Magnus Åström, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 47 days.

(21) Appl. No.: 15/739,181

(22) PCT Filed: Jun. 23, 2015

(86) PCT No.: PCT/EP2015/064057
§ 371 (c)(1),
(2) Date: Dec. 22, 2017

(87) PCT Pub. No.: WO2016/206719
PCT Pub. Date: Dec. 29, 2016

(65) Prior Publication Data
US 2018/0167836 A1 Jun. 14, 2018

(51) Int. Cl.
*H04W 24/10* (2009.01)
*H04W 72/12* (2009.01)
(Continued)

(52) U.S. Cl.
CPC ......... *H04W 24/10* (2013.01); *H04W 28/16* (2013.01); *H04W 36/0005* (2013.01); *H04W 36/26* (2013.01); *H04W 76/20* (2018.02)

(58) Field of Classification Search
CPC . H04W 24/10; H04W 36/26; H04W 36/0005; H04W 76/20; H04W 28/16; H04W 36/24
See application file for complete search history.

(56) References Cited

U.S. PATENT DOCUMENTS

2012/0113866 A1   5/2012  Tenny et al.
2012/0178465 A1*  7/2012  Lin .................. H04W 24/10
                                                   455/450
(Continued)

FOREIGN PATENT DOCUMENTS

WO        0141492 A1    6/2001
WO     2009080057 A1    7/2009
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.4.0, Dec. 2014, 1-60.
(Continued)

*Primary Examiner* — Kiet Tang
(74) *Attorney, Agent, or Firm* — Murphy, Bilak & Homiller, PLLC

(57) ABSTRACT

The disclosure provides a method (90) performed in a network node (2) for handling simultaneous measurement signaling and data communication with a communications device (3). The method (90) comprises transmitting (91) data to the communication device (3) using a transmission mode corresponding to the communication device (3) using a first number of reception elements (123, 125); establishing (92) a need for the communication device (3) to perform measurements and a capability of the communication device (3) for receiving measurement signaling using a second number of reception elements (123, 125) while receiving data using a reduced number of reception elements (123,
(Continued)

125); sending (93), to the communication device (3), a request to initialize the measurements, the request comprising a measurement configuration; and transmitting (94) the data using a transmission mode corresponding to the communication device (3) using the reduced number of reception elements (123, 125) for the data. A corresponding network node, method in a communications device, communications device, computer programs and computer program products are provided.

24 Claims, 10 Drawing Sheets

(51) Int. Cl.
    *H04W 76/20*     (2018.01)
    *H04W 28/16*     (2009.01)
    *H04W 36/00*     (2009.01)
    *H04W 36/26*     (2009.01)

(56) References Cited

U.S. PATENT DOCUMENTS

| | | | |
|---|---|---|---|
| 2012/0252477 A1* | 10/2012 | Rao | H04W 72/1231 455/452.1 |
| 2013/0155890 A1 | 6/2013 | Bhattad et al. | |
| 2014/0029516 A1 | 1/2014 | Heo et al. | |
| 2014/0086209 A1 | 3/2014 | Su et al. | |
| 2014/0140424 A1 | 5/2014 | Clevorn et al. | |
| 2015/0016282 A1 | 1/2015 | Su | |

FOREIGN PATENT DOCUMENTS

| | | |
|---|---|---|
| WO | 2010049345 A1 | 5/2010 |
| WO | 2011041758 A2 | 4/2011 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.4.0, Dec. 2014, 1-124.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.6.0, Dec. 2014, 1-992.

3GPP, "3rd Generation Partnership Project; Technical Specification Group Radio Access Network; Physical channels and mapping of transport channels onto physical channels (FDD) (Release 12)", 3GPP TS 25.211 V12.1.0, Dec. 2014, 1-67.

3GPP, "3rd Generation Partnership Project; Technical Specification Group Radio Access Network; Spreading and modulation (FDD) (Release 12)", 3GPP TS 25.213 V12.0.0, Sep. 2014, 1-50.

Unknown, Author, "Introduction of band specific compressed mode", 3GPP TSG-RAN2 Meeting #73-BIS, R2-112086, Shanghai, China, Apr. 11-15, 2011, 1-39.

\* cited by examiner

METHOD FOR HANDLING SIMULTANEOUS MEASUREMENT SIGNALING AND DATA COMMUNICATION, NETWORK NODE, WIRELESS DEVICE, COMPUTER PROGRAMS AND COMPUTER PROGRAM PRODUCTS

TECHNICAL FIELD

The technology disclosed herein relates generally to the field of multiple-input and multiple-output (MIMO) technology, and in particular to methods and means for handling simultaneous inter-frequency and/or inter-Radio Access Technology (RAT) measurements and data communication.

BACKGROUND

In 4G, such as Long Term Evolution (LTE) systems, inter-frequency and inter-RAT (Radio Access Technology) mobility measurements and inter-frequency positioning (Observed Time Difference Of Arrival, OTDOA) are carried out by a wireless communication device such as a user equipment (UE) in measurement gaps that are 6 ms long with a periodicity of 40 or 80 ms depending on configuration. These measurement gaps are time periods during which no data transmission is scheduled by the network node (e.g. eNodeB).

FIG. 1 illustrates the impact of a 6 ms measurement gap for downlink (illustrated at upper row of subframes) and uplink (illustrated at lower row of subframes). According to the 3GPP standard for LTE systems (3GPP TS 36.133 V12.6.0 clause 8.1, a user equipment or machine type communication device (MTC) operating on a 4G frequency division duplexing (FDD) carrier shall not transmit on uplink in a subframe that occurs immediately after the measurement gap. Hence the measurement gap, indicated as black subframes in FIG. 1, is 6 subframes in downlink and 7 subframes in the uplink, as illustrated in FIG. 1. Further, a network node, such as a base station, transmitting to the UE in any of the four subframes preceding the measurement gap, these subframes being indicated by hatched subframes in the FIG. 1, cannot get feedback (acknowledgment/negative acknowledgment, ACK/NACK) on the transmitted transport block. This since the feedback is to be sent by the UE four subframes after reception, which in this case would mean during the measurement gap. According to the standard, a non-adaptive retransmission will follow (3GPP TS 36.321 V12.4.0 clause 5.4). As a consequence, the network nodes generally avoid transmitting to the UE in those subframes, meaning that the de facto measurement gap is instead 10 ms on the downlink (the hatched subframes and the black subframes added).

It is similar for the uplink, i.e., due to the measurement gap, the UE cannot get feedback from the network node on whether uplink transmissions were successfully decoded. Here the LTE standard (3GPP TS 36.321 V12.4.0 clause 5.4) stipulates that the UE shall consider a transmitted transport block to have been successfully decoded by the network node. As a consequence, if this is not the case the network node has to schedule the UE to transmit the transport block again, after the measurement gap.

In order for a UE to be able to transmit on the uplink it needs a scheduling grant (SG), which it may request via a scheduling request (SR). The communication resources pointed at by the scheduling grant then appear four subframes after the subframe in which the scheduling grant was received by the UE. Hence if the UE receives a scheduling grant immediately after the measurement gap, it has to wait another four subframes to resume transmissions on the uplink. Hence the uplink outage due to the measurement gap is at least 10 ms, and potentially more if the network node avoids scheduling the UE for uplink transmissions in the four subframes immediately before the gap.

A similar shortcoming due to measurement signaling disturbing uplink transmission arises in case of cell detection, wherein the UE detects synchronization signals transmitted by the network nodes. For instance, for 4G FDD, the repetition period for the synchronization signals is 5 ms and under the assumption that a target cell may be asynchronous usually a minimum of 5 ms+1 Orthogonal frequency-division multiplexing (OFDM) symbol, approximately 5.1 ms, consecutive radio time is used by the UE for each attempt to detect a primary synchronization signal (PSS). Depending on approach for detecting a secondary synchronization signal (SSS) (coherently or non-coherently with respect to PSS), an additional OFDM symbol may need to be collected in order to acquire the pair of PSS and SSS. In 4G TDD (Time Division Duplexing), due to the synchronization signals being laid out differently and having two OFDM symbols inserted between them, up to approximately 5.4 ms contiguous radio time is needed. If less than this radio time is available, the UE will, in worst case, be blind to cells having particular frame timings, particularly if each measurement opportunity is aligned with a raster of 5 ms.

The existing measurement gaps entail a number of drawbacks. For instance, the measurement gaps that are available result in prolonged time to make the measurements. This in turn may have consequences such as e.g. identification of candidate cells (e.g. GSM cells) taking several seconds and the measurement of neighboring cells (e.g. LTE neighboring cells) becoming inefficient due to the few sub-frames that are available within a measurement gap.

Further, for each measurement gap there is about 10 ms when the UE cannot perform uplink transmissions due to either the measurement gap as such, or since after the measurement gap, the scheduling grant that the UE receives is applicable 4 sub-frames later. Moreover, since the UE cannot receive an ACK/NACK on transmissions immediately before the measurement gap, it will in many cases not get scheduled there. This means that the impact of the uplink gap becomes in fact even longer: 14 ms. Given that the measurement gaps may have a repetition rate of 40 ms it is a significant restriction to the scheduling and also has an impact on latency-sensitive applications.

SUMMARY

An objective of the present disclosure is to solve or at least alleviate the above mentioned problems.

The objective is according to an aspect achieved by a method performed in a network node for handling simultaneous measurement signaling and data communication with a communications device. The method comprises transmitting data to the communication device using a transmission mode corresponding to the communication device using a first number of reception elements; establishing a need for the communication device to perform measurements and a capability of the communication device for receiving measurement signaling using a second number of reception elements while receiving data using a reduced number of reception elements; sending, to the communication device, a request to initialize the measurements, the request comprising a measurement configuration; and transmitting the data using a transmission mode corresponding to the communication device using the reduced number of reception elements for the data.

The objective is according to an aspect achieved by a computer program for a network node for handling simultaneous measurement signaling and data communication with a communication device. The computer program comprises computer program code, which, when executed on at least one processor on the network node causes the network node to perform the method as above.

In the existing solutions, the measurement gaps constitute a significant restriction on the scheduling performed by the network node, e.g. since it cannot get feedback on the transmitted transport block from the wireless device, which is busy measuring. In contrast, the present method advantageously enables the network node to schedule wireless devices without the restrictions imposed by the measurement gaps, since the measurement gaps are essentially removed by simultaneous measurement signaling and data signaling, or data communication.

The objective is according to an aspect achieved by a computer program product comprising a computer program as above and a computer readable means on which the computer program is stored.

The objective is according to an aspect achieved by a network node for handling simultaneous measurement signaling and data communication with a communications device. The network node is configured to transmit data to the communication device using a transmission mode corresponding to the communication device using a first number of reception elements; establish a need for the communication device to perform measurements and a capability of the communication device for receiving measurement signaling using a second number of reception elements while receiving data using a reduced number of reception elements; send, to the communication device, a request to initialize the measurements, the request comprising a measurement configuration; and transmit the data using a transmission mode corresponding to the communication device using the reduced number of reception elements for the data.

The objective is according to an aspect achieved by a method performed in a communication device for simultaneous measurement signaling and data signaling with a network node. The method comprises receiving data from the network node using a first number of reception elements; establishing a need for performing measurements; sending, to the network node a request for using a reduced number of reception elements for receiving the data; receiving from the network node a measurement configuration and an acknowledgment to use the reduced number of reception elements; and receiving measurements according to the measurement configuration using a second number of reception elements, while receiving the data using the reduced number of reception elements.

In contrast to the existing solutions, wherein measurement gaps and required measurement signaling result in disturbed uplink transmissions and/or downlink data reception, the present method advantageously enables the use of a reduced set of receiver branches to be used in the wireless device when receiving data from the serving cell, while still keeping continuity of e.g. HARQ processes by using remaining receiver branches for measurement signaling. The method in the communication device enables actual ACK/NACK to be received by the communications device on uplink transmission instead of it making assumptions on successful decoding by the network node.

The objective is according to an aspect achieved by a computer program for a communication device for simultaneous measurement and data communication with a network node. The computer program comprises computer program code, which, when executed on at least one processor on the communication device causes the communication device to perform the method as above.

The objective is according to an aspect achieved by a computer program product comprising a computer program as above and a computer readable means on which the computer program is stored.

The objective is according to an aspect achieved by a communication device for simultaneous measurement signaling and data signaling with a network node. The communication device is configured to receive data from the network node using a first number of reception elements; establish a need for performing measurements; send, to the network node a request for using a reduced number of reception elements for receiving the data; receive from the network node a measurement configuration and an acknowledgment to use the reduced number of reception elements; and receive measurements according to the measurement configuration using a second number of reception elements, while receiving the data using the reduced number of reception elements.

Further features and advantages of the embodiments of the present teachings will become clear upon reading the following description and the accompanying drawings.

DETAILED DESCRIPTION

Figure 1:
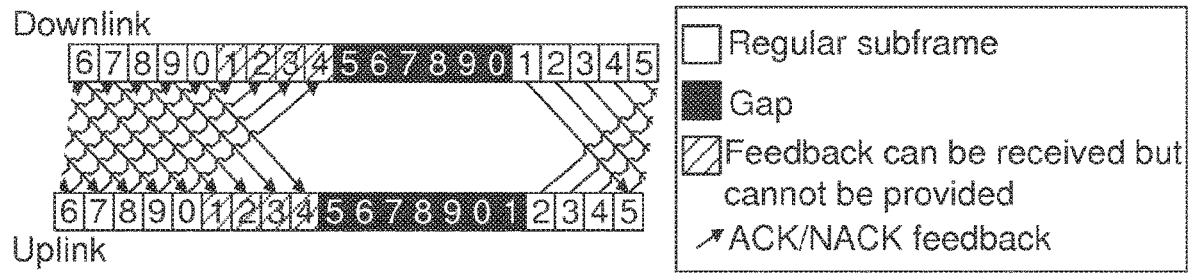
FIG. 1 illustrates impact of measurement gaps on wireless link.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Notes on vocabulary and definitions are given first: the term "measurement gap" refers to gaps for which the purpose is to allow the UE to momentarily stop communicating with the serving cell(s) to instead tune to other carriers, potentially belonging to other radio access technologies, in order to detect and monitor neighbor cells. Such gaps may for instance comprise, but is not limited to:

4G measurement gaps,
3G FDD transmission gaps (also denoted compressed mode gaps),
3G TDD Low Chip Rate Dedicated Channel (LCR DCH) measurement occasions,
3G TDD LCR idle intervals,
3G TDD LCR unused time slots,
3G Forward Access Channel (FACH) measurement occasions, and
2G idle frames As mentioned in the background section, the UE needs to do cell detection, and the cell detection procedures differ between different Radio Access Technologies (RATs), e.g. between 2G (Global System for Mobile Communications (GSM), General packet radio service (GPRS). Enhanced Data rates for GSM Evolution (EDGE)), 3G (Wideband Code Division Multiple Access (WCDMA). High Speed Packet Access (HSPA)), FDD and 4G (LTE). In the following the shortcomings of prior art in view of measurement signaling are elaborated on a bit. Cell detection in legacy systems is generally carried out by detecting synchronization signals transmitted by the network node according to a predefined pattern, where the first synchronization signal exists in one or a few versions, essentially providing information about the existence of a cell. The UE has to search for this primary synchronization signal at all possible timings, and once it detects it, it knows where to look for a secondary synchronization signal which further reveals a cell identity. The cell identity is different for different radio access technologies. For instance, the cell identity used in 2G, e.g. in GSM systems, is the base station identity code (BSIC), in 3G, e.g. in WCDMA or HSPA systems, the scrambling code (SC) and in 4G, e.g. in LTE systems, the physical cell identity (PCI). The signaling may, depending on radio access technology, also provide further information explicitly or implicitly on frame timing, transmission modes, frame type, etc. In 4G the synchronization signals comprise: Primary Synchronization Signal (PSS) and Secondary Synchronization signal (SSS); in 3G FDD: Primary synchronization channel (PSCH) and Secondary Synchronization channel (SSCH); and in 2G: Frequency Correction Channel (FCCH) and Synchronization channel (SCH).

The primary and secondary synchronization signals of 4G FDD are self-contained in that by successfully detecting one instance of PSS and one instance of SSS, the UE acquires information on physical cell identity and radio frame timing, after which it knows how cell-specific reference signals are coded and laid out in a time-frequency resource element grid. The received strength and quality of cell-specific reference signals are measured and used for mobility decisions either by the UE or by the network node depending on mode of operation of the UE (idle or connected mode). As described in the background section, a complete pair of PSS and SSS may need to be collected by the UE, which may require substantial consecutive radio time.

A similar shortcoming occurs also for 3G FDD, which is described next.

Figure 2:
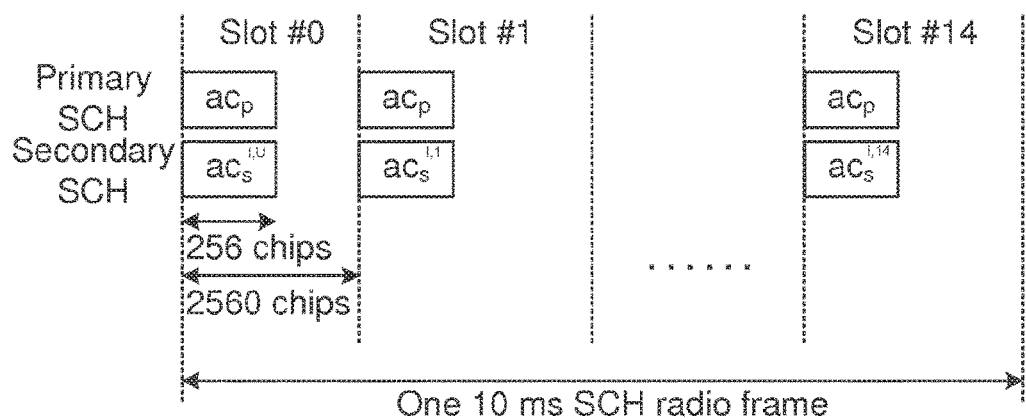
FIG. 2 illustrates structure of a synchronization channel.

FIG. 2 illustrates the synchronization channel pattern in 3G FDD, and in particular the structure of Synchronization Channel (SCH) in 3G FDD (WCDMA) (3GPP TS 25.211 V12.1.0, clause 5.3.3.5). A 10 ms radio frame is divided into 15 slots of equal size as indicated at Slot#0, . . . , Slot#14 in the FIG. 2. PSCH and SSCH are overlaid and transmitted in the first 10th of each slot. The PSCH and SSCH burst length is 256 chips (as indicated in FIG. 2), while a slot has the length of 2560 chips. PSCH carries the primary synchronization code (PSC) which is the same for all 3G FDD cells and all slots, whereas SSCH carries the secondary synchronization code (SSC) which may differ on a slot-within-the-frame basis according to a predetermined sequence associated with the one out of 64 scrambling code groups (set of 8 potential scrambling codes) to which the cell belongs.

In order to acquire an intact pair of synchronization signals, at least up to 10 ms/15, equal to about 0.73 ms, needs to be collected. However, although perhaps enough for detecting PSCH for a UE having favorable radio conditions, several instances of the SSCH taken from different slots are needed in order to determine to which of 64 scrambling code groups the cell belongs.

TABLE 1

Excerpt of S-SCH encoding for scrambling code groups (3GPP TS 25.213 V12.0.0, clause 5.2.3.2)

| Scrambling Code Group | slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0 | 1 | 1 | 2 | 8 | 9 | 10 | 15 | 8 | 10 | 16 | 2 | 7 | 15 | 7 | 16 |
| Group 1 | 1 | 1 | 5 | 16 | 7 | 3 | 14 | 16 | 3 | 10 | 5 | 12 | 14 | 12 | 10 |
| Group 2 | 1 | 2 | 1 | 15 | 5 | 5 | 12 | 16 | 6 | 11 | 2 | 16 | 11 | 15 | 12 |
| Group 3 | 1 | 2 | 3 | 1 | 8 | 6 | 5 | 2 | 5 | 8 | 4 | 4 | 6 | 3 | 7 |
| Group 4 | 1 | 2 | 16 | 6 | 6 | 11 | 15 | 5 | 12 | 1 | 15 | 12 | 16 | 11 | 2 |
| Group 5 | 1 | 3 | 4 | 7 | 4 | 1 | 5 | 5 | 3 | 6 | 2 | 8 | 7 | 6 | 8 |
| . . . | . . . | . . . | . . . | . . . | . . . | . . . | . . . | . . . | . . . | . . . | . . . | . . . | . . . | . . . | . . . |
| Group 63 | 9 | 12 | 10 | 15 | 13 | 14 | 9 | 14 | 15 | 11 | 11 | 13 | 12 | 16 | 10 |

Sequences of SSCs for 7 out of the 64 scrambling code groups are shown in Table 1. If basing a decision on only few such instances it is not possible to distinguish between particular scrambling code groups; see for instance Groups 0 and 1 where the first two slots use the same SSC sequence.

The cell detection is generally based on analyzing consecutive radio time corresponding to at least 4 consecutive slots (about 2.7 ms) in order to have a reasonable chance of accurately determining to which scrambling code group a cell belongs. The detected sequence of versions is then correlated with the tabularized predetermined sequences.

For completeness it may be noted that PSC and SSC may additionally be subjected to phase modulation to indicate the transmission mode in use for the primary common control physical channel (PCCPCH).

Figure 3:
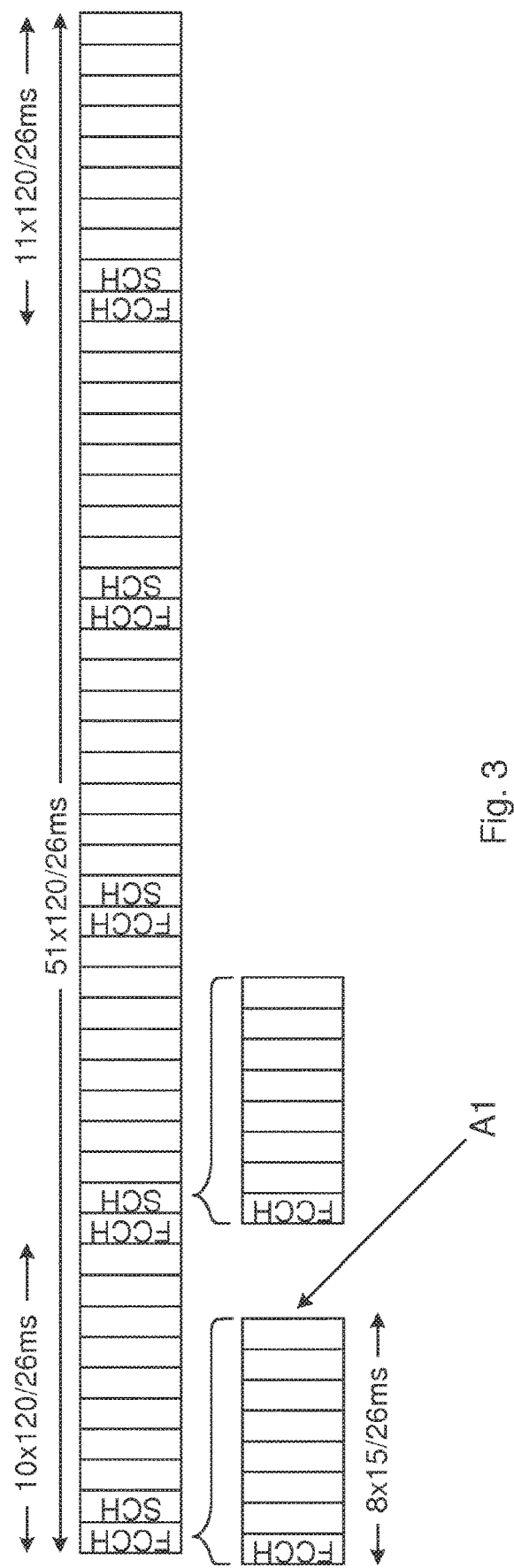
FIG. 3 illustrates synchronization signal pattern in a multiframe.

FIG. 3 illustrates the layout of signals used for synchronization in a 2G system, and in particular a GSM synchronization signals pattern in a 51-multiframe. The FCCH, constituting a primary synchronization signal, and SCH, constituting a secondary synchronization signal are transmitted in a control multiframe structure consisting of 51 Time division multiple access (TDMA) radio frames and occupying 235.4 ms. Each TDMA radio frame (one indicated at arrow A1) corresponds to 120/26 ms (approximately 4.615 ms) and is further divided into 8 slots. FCCH is transmitted in the first slot of TDMA frames 0, 10, 20, 30, and 40 and the same code is transmitted in all cells and slots. SCH is transmitted in the first slot of TDMA frames 1, 11, 21, 31 and 41. It carries BSIC and the frame number of the TDMA frame that hosts the decoded instance of SCH.

In 2G the cell detection is generally carried out by first measuring the power, also known as acquiring a received signal strength indication (RSSI), on a GSM carrier and if the received power is large enough compared to other GSM carriers, the UE searches for FCCH. When measurements are carried out in time-constrained measurement gaps the search for FCCH continues over a multitude of gaps until FCCH is detected or a timer expires by which the UE prioritizes searches on another GSM carrier. The timer is needed since whether it will at all be possible to detect the GSM cell to large extent depends on which measurement gap pattern or measurement gap configuration is available for GSM measurements.

The measurement gap pattern or measurement gap configuration is a pattern in time which the network node, such as the base station or eNodeB, has specified which time intervals are to be used for serving cell communication and which time intervals the UE can use its resources (radio, baseband processors and accelerators, memory) to perform inter-frequency and/or inter-RAT measurements Once the FCCH has been detected the UE knows where to find SCH and can seize the next opportunity to acquire and decode it.

The minimum time needed in order to capture an intact slot with arbitrary timing is 30/26 ms (approximately 1.15 ms).

From the above it is realized that the shortcomings of prior art relating to measurement gaps exists in several communications standards or RATs.

Figure 4:
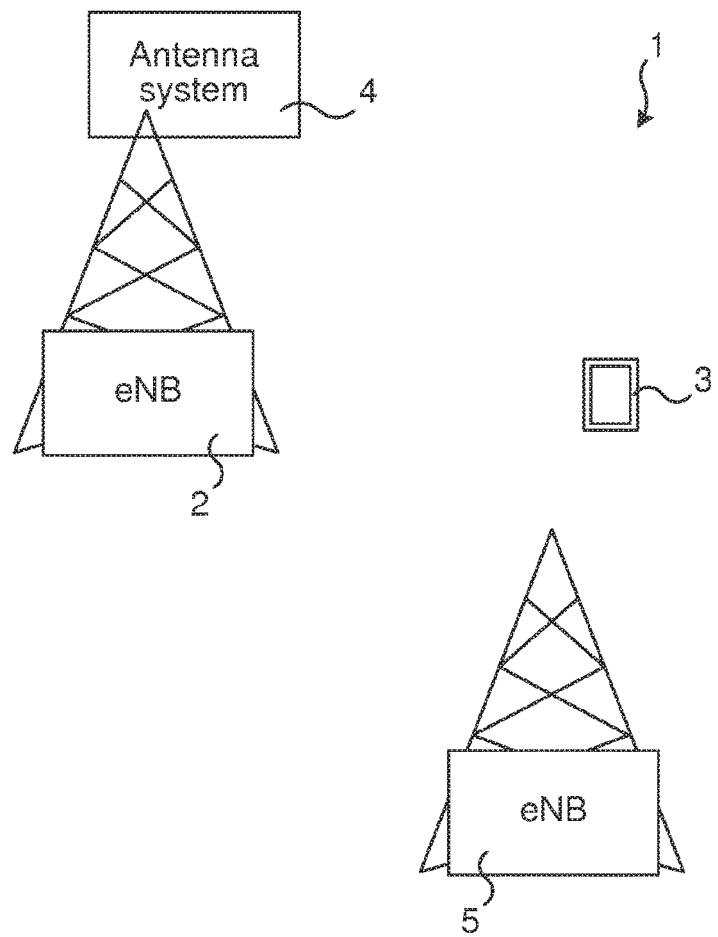
FIG. 4 schematically illustrates an environment in which embodiments according to the present teachings may be implemented.

FIG. 4 illustrates schematically an environment in which embodiments according to the present teachings may be implemented. A communications system 1 comprises a number of network nodes 2, 5 arranged to provide wireless communication to one or more wireless devices 3. The term "network node" 2, 5 is used to denote one or more relevant network entities, and may for instance include but is not limited to: 4G evolved NodeB (eNodeB, eNB), 3G NodeB (NB), 3G Radio Network Controller (RNC), 2G Base station (BS), 2G Base station controller (BSC). In order to communicate wirelessly with the wireless devices 3, the network nodes 2, 5 may comprise receiver/transmitter elements, e.g. antenna systems 4, processing circuitry etc. Each network node 2, 5 may control one or more geographical areas, denoted cells, in which the wireless communication is provided.

The term wireless device 3 is used herein to denote a device communicating wirelessly and is in the following exemplified by UE. The wireless device 3 (also denoted communication device 3) may thus be any type of device able to communicate wirelessly, and may sometimes be denoted MTC device, mobile station (MS) etc., and may comprise sensors, mobile phones, tablet computers etc.

For some standards, like LTE, the communications system 1 may also support e.g. Multiple-Input-Multiple-Output (MIMO), e.g. Single-User-MIMO (SU-MIMO), and the network nodes 2, 5 may use multiple transmitter antennas to send data to multiple receiver antennas of a single wireless device 3. The network node 2, 5 may hence support different transmission modes, e.g. SU-MIMO modes (transmit diversity, closed-loop rank-1 spatial multiplexing, open-loop spatial multiplexing, closed-loop spatial multiplexing). "Rank" refers to the number of data streams transmitted over the same time and frequency resource, corresponding to the number of layers used, e.g. Rank 1=one data stream. The network node 2, 5 typically receives information from the wireless device 3, such as e.g. a rank indicator (RI), number of layers that the wireless device can support under the current radio conditions and current modulation scheme, channel quality indicator (CQI), etc. The network node 2, 5 may then use e.g. the CQI to select a suitable modulation and coding scheme (MCS) for the channel conditions at hand. The network node 2, 5 may adjust its transmission mode, number of resources for the wireless device 3 based on whether the CQI and RI reported by the wireless device 3 matches the expected values and/or whether the signal is received at an acceptable error rate. In some transmission modes, the wireless device 3 may further provide a precoding matrix indicator (PMI), determining a precoding matrix suitable for the current channel conditions. The network node 2, 5 may then adapt the transmission (transmission mode) to the channel conditions.

The rank can be seen as defining how many separate signal paths the wireless device 3 can receive, and thus how many parallel or simultaneous data streams that the network node 2, 5 may send to this wireless device 3. The network node 2, 5 may for instance have 1, 2, 4 or 8 transmit antennas while the wireless device 3 has 2, 4 or 8 receive antennas; this would correspond to MIMO 1×2, wherein 1 indicates number of network node transmit antennas and 2 indicates number of receive antennas of the wireless device, 1×4, 1×8; 2×2, 2×4, 2×8; 4×2, 4×4, 4×8; and 8×2, 8×4, 8×8, respectively.

Briefly, methods and devices are provided that allocates a subset of multiple antennas and/or receiver chains (also denoted receiver branches or reception elements) for continued reception in the UE while, simultaneously, another subset is allocated for radio resource management (RRM) measurements. According to the present teachings, the antennas and/or receiver chains of the UE 3 are divided for use between RRM measurements and data reception. For instance, when identifying decreased channel quality e.g. by decreasing RSRP, RSRQ or RSSI, it is desirable for the UE 3 to perform RRM measurements in order to verify optimal connectivity, i.e., that the UE 3 is indeed associated with the eNB 2, 5 to which it has the best radio link. In order to avoid disassociating the UE 3 to the presently associated eNB 2, or to interrupt present data transmission, it is, according to the present teachings, suggested to utilize a subset of antennas and/or receiver chains for RRM measurements while simultaneously utilizing the remaining antennas and/or receiver chains for connectivity to the presently associated eNB 2.

The selection in the UE 3 of which antennas and/or receiver chain(s) to use for data reception and which antennas and/or receiver chain(s) to use for RRM measurements is simplistically, but optimally, performed by using the antennas or antenna pairs with the best reception for data, whereas the remaining antennas or antenna pairs and/or receiver chains are used for RRM measurements. The simple reason for this is that since no á priori knowledge exists for which antenna or antenna pairs and/or receiver chains that is/are preferable for RRM measurements, hence all antennas may be selected with equal probability.

To reduce the number of active receiver antennas and/or active receiver chains when reception is deteriorating might seem to be a suboptimal action. However, the inventors have found that this is indeed an attractive and viable solution for several reasons.

In the following the term "reception elements" or "receiver branches" is used for denoting the receiver antennas and/or the receiver chains. Such reception element may for instance comprise a number of receiver (Rx) antennas and a number of receiver chains. For the present teachings, the number of receiver antennas should be at least two, but any number is conceivable, e.g. 4 receiver antennas or 6 or 8 or even more receiver antennas. The receiver chains, correspondingly two or more, may comprise conventional components such as digital processor, analog-to-digital converters, various filters, amplifiers, up-converters, down-converters etc., e.g. for frequency conversion, filtering, gain control, baseband processing etc. Several receiver chains may share the same front end components and/or the same antenna via e.g. a diplexer. As a note on vocabulary, the antenna may be part of the receiver chain.

While the prior art solutions require the UE 3 to interrupt a data transmission in order to perform RRM measurements or OTDOA positioning using inter-frequency carriers, the present teachings allow for simultaneous data reception and RRM measurements hence allowing for continuous, uninterrupted data traffic. The operation also involves less scheduling consequences for the network node 2, 5 in terms of scheduling rearrangements, data buffering etc.

Furthermore, the various embodiments according to the present teachings bring about improved RMM performance such as, for instance:
 Shorter cell identification times such that e.g. GSM cells (as a target cell) may be identified within 60 ms instead of several seconds that is the worst case when using measurement gaps.
 Improved neighboring cell measurements (such as synchronization, channel estimation etc.) by allowing longer measurement intervals and hence using more subframes.

A scenario that may benefit from the present teachings is services having a specific Quality of Service (QoS) requiring low latency. In this case there may not be sufficient time for making the required RRM measurements without violating the latency requirement. According to embodiments of the present teachings RRM measurements may be performed in parallel with data transmission, hence not affecting latency at all, or only to limited extent.

An increased number of UE receive antennas and/or receiver chains is expected and will allow for more parallel processing such as e.g., the herein suggested simultaneous data reception and RRM measurements. As the cellular networks will put more demands on the UE 3, such parallel processing will become increasingly important in order to handle tighter low-latency requirements and other improved QoS parameters. In the following, methods and apparatuses are described that allows for the simultaneous data reception and RRM measurements in order to maintain and ensure high QoS operation over several cells and even for several communications standards or RATs.

In various embodiments according to the present teachings, the UE 3 may signal to the eNB 2 that it has reduced its number of active receive antennas and/or receiver chains in order to perform parallel RRM measurements. The eNB 2 may then adjust Modulation and coding scheme (MCS) and rank (number of layers) in order to maintain desirable performance of the data communication, e.g., a certain block error rate (BLER). Upon receiving the acknowledgement of the reduced number of active receive antennas and/or receiver chains, either explicitly by control signaling, or implicitly by an adjusted transmission scheme, the UE 3 starts performing RRM measurements on inter-frequency and/or inter-RAT carriers with a subset of its receive antennas and/or receiver chains, while another antenna and/or receiver chain subset maintains data reception. Upon identifying a new cell, the new cell is added to a list of existing cells, until sufficiently many cells, or a cell with a sufficient quality has been identified, or all configured inter-frequency and/or inter-RAT carriers have been searched. If a cell with a higher quality has been found, the UE 3 may send a measurement report to the eNB 2 indicating that the neighbor cell is a good candidate for handover, by which the eNB 2 hands the UE 3 over to the neighbor cell.

Figure 5:
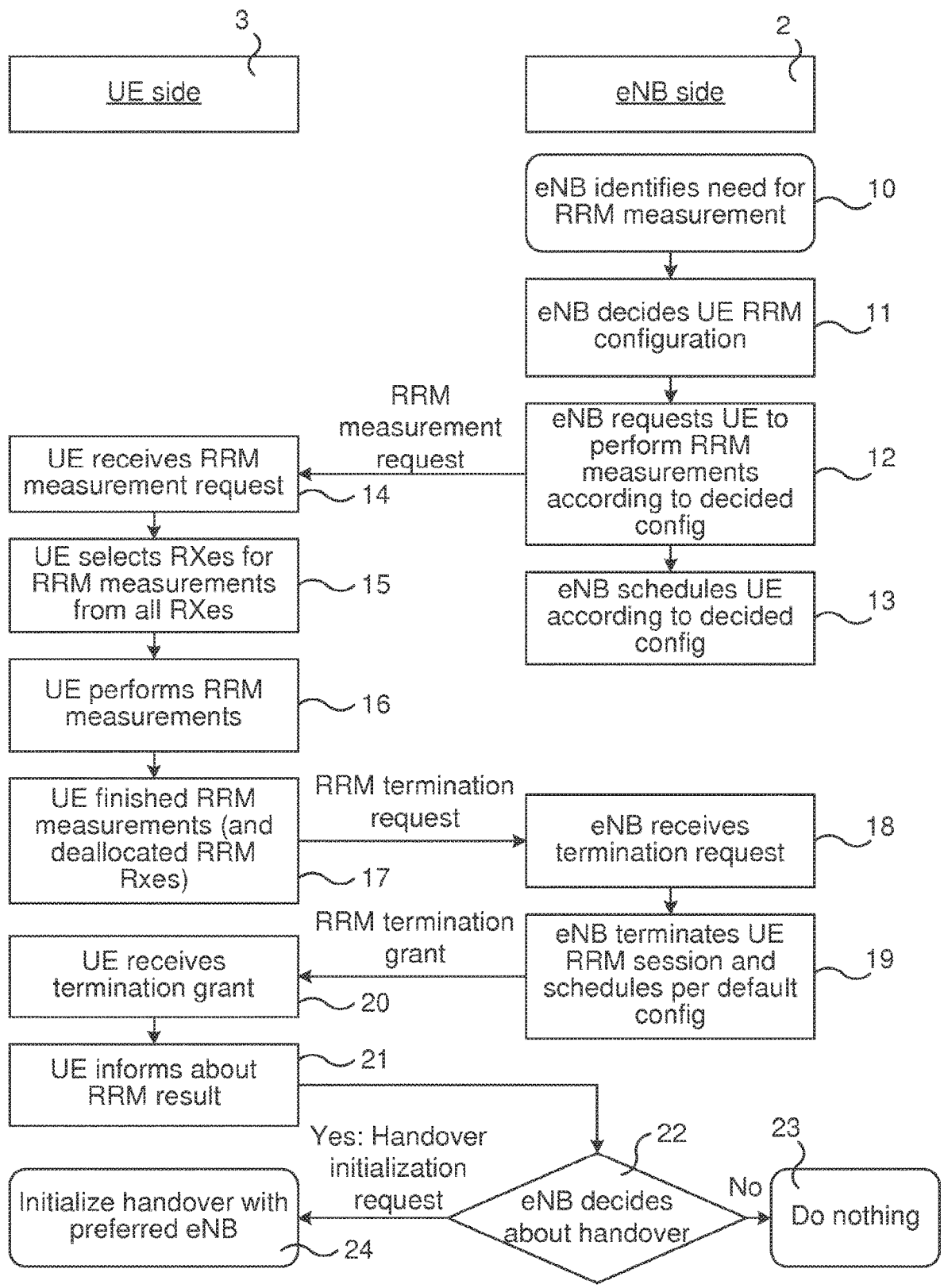
FIG. 5 is a signaling scheme illustrating signaling between a network node and a wireless device according to the present teachings.

FIG. 5 is a signaling scheme illustrating signaling between a network node and a wireless device according to the present teachings.

The network node 2, in the following exemplified by eNB, may identify a need for the UE 3 to perform RRM measurements (box 10).

At box 11, the eNB 2 decides on a particular RRM configuration for the UE 3, for instance an inter-carrier measurement configuration, requests, at box 12, the UE 3 to perform measurements according to the decided RRM configuration by sending an RRM measurement request, and schedules (box 13) the UE 3 accordingly.

At box 14 the UE 3 receives the RRM measurement request from the eNB 2 and selects, in box 15, among all of its reception elements, e.g. antennas and/or receiver chains, which to use for the RRM measurements requested by the eNB 2. The UE 3 then performs the requested RRM measurements using the selected set of reception elements (box 16).

At box 17, when the UE 3 has finished the RRM measurements it deallocates the reception elements used for the RRM measurements, and sends a RRM termination request to the eNB 2. At box 18, the eNB 2 thus receives the RRM termination request and terminates (box 19) the RRM session for the UE 3, schedules the UE 3 according to a default configuration and sends an RRM termination grant to the UE 3. The default configuration may, for instance, be to use all reception elements for data reception, or to use the configuration used prior to the RRM measurements.

At box 20, the UE 3 receives the termination grant and then informs (box 21) the eNB 2 about the RRM measurement results by sending a RRM result message.

Based on the measurement results the eNB 2 may decide (decision box 22) whether a handover should be made. If no, then the signaling ends (box 23). If yes, then the eNB 2 sends a handover initialization request to the UE 3, which (at box 24) initializes the handover procedure towards a preferred eNB.

Figure 6:
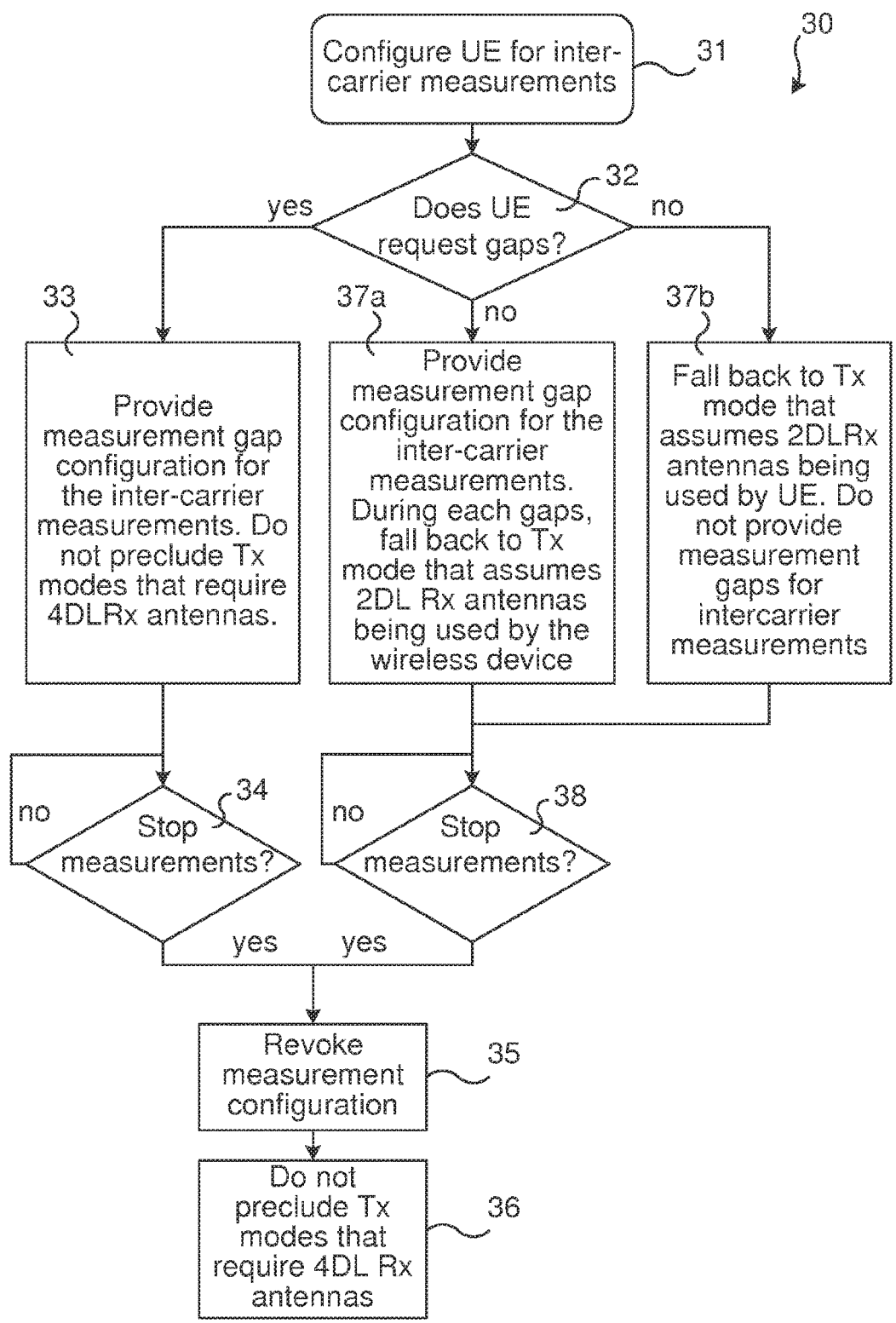
FIG. 6 is a flow chart illustrating embodiments according to the present teachings.

FIG. 6 is a flow chart illustrating embodiments according to the present teachings. The flow chart illustrates how a network node 2 may provide a measurement gap configuration (or measurement pattern) to either be used for (conventional) measurement method (no receive antennas and/or receiver chains used for data reception) or for reception using a reduced set of reception elements, depending on UE support.

In box 31, the eNB configures the UE for the inter-carrier measurements, and decides (decision box 32) if the UE 3 requires measurement gaps. The UE 3 may for instance have indicated to the eNB 2 e.g. via capability reporting that it can support inter-carrier measurements by using a subset of the reception (Rx) elements used for serving cell reception, while continuing the serving cell reception on remaining reception elements.

If the UE 3 needs conventional measurement gaps (i.e. the UE is not capable of simultaneously measure and continue serving cell reception), flow continues to box 33, wherein the eNB 2 provides the required measurement gap configuration for the inter-carrier measurements. Transmission modes that require full set of reception elements, e.g. 4 DL reception antennas, may be used outside the measurement gaps. That is, the eNB may transmit assuming full receiver functionality at the UE, e.g. the mentioned 4 DL receive antennas if the UE has 4 receive elements (or any number that the UE might have).

At box 34, the UE 3 does the measuring (refer also to boxes 16-20 of FIG. 5), and when finished, the flow continues to box 35, wherein the eNB 2 withdraws the measurement configuration, by sending an updated but empty or modified measurement configuration to the UE. The eNB 2 reverts to a default configuration wherein (box 36) transmission modes that require full set of reception elements, e.g. 4 DL receive antennas, may be used.

If, in box 32, the UE has indicated its capabilities for simultaneous reception, or the eNB 2 in some other way has knowledge about this capability, flow may continue to either box 37a or box 37b, which boxes represent different embodiments.

In box 37a, when the eNB 2 configures the UE 3 for inter-carrier measurements, it provides a pattern, e.g. a measurement (gap) pattern, specifying the subframes where the UE 3 can use a reduced number of reception elements and/or receiver chains for the serving cell reception (i.e. receiving data from the serving cell(s)). This measurement (gap) pattern may for instance be similar in structure to a measurement gap pattern as defined in 3GPP LTE. In those subframes the eNB 2 falls back to a transmission mode that the UE 3 can receive with a reduced number of receive antennas and/or receiver chains. For other than the specified subframes in the measurement (gap) pattern the eNB 2 does not preclude transmission modes that require the full set of receive antennas and/or receiver chains to be used for serving cell reception. During the measurement (gap) subframes the UE 3 tunes one or more receive antennas and/or receiver chains e.g. to an inter-carrier frequency for mobility measurements, and uses a reduced number of receive antennas and/or receiver chains (e.g. 2) for the serving cell reception. In transmission time intervals (TTIs) not indicated by the measurement gap pattern the UE 3 uses as many receive antennas and/or receiver chains as indicated by its capabilities (e.g. 4) and the transmission mode in use by the eNB 2.

In box 37b, when the eNB 2 configures the UE 3 to carry out inter-carrier measurements, the eNB 2 falls back to a transmission mode that the UE 3 can receive with a reduced set of receive antennas and/or receiver chains, i.e. enabling the UE 3 to continue receiving data while performing the measurements. Upon receiving an inter-carrier measurement configuration the UE 3 re-assigns one or more of the receive antennas and/or receiver chains from serving cell reception to inter-carrier measurements, and uses the remaining receive antennas and/or receiver chains (e.g. 2) for serving cell reception.

In the box 37a embodiment, the eNB 2 provides a measurement (gap) pattern or measurement gap configuration to be used either for measurement gaps or for reception using reduced set of reception elements, depending on UE 3 capability. That is, the eNB 2 transmits data to the UE 3 using a transmission mode suitable for reception by the UE 3 using a reduced set of receive antennas and/or receiver chains inside the measurement gaps. Outside the measurement gaps, the eNB uses a transmission mode suitable for reception by the UE 3 using all (or as many as the channel conditions allow) receive antennas and/or receiver chains.

Inside the measurement gaps, the UE 3 measures on e.g. inter-carrier(s) using a subset of all its receive antennas and/or receiver chains, while receiving the data from the serving cell(s) with the remaining set of its receive antennas and/or receiver chains. Outside the indicated measurement gaps, the UE 3 receives the data from the serving cell(s) using all its receive antennas and/or receiver chains (or as many as the channel conditions allow). These corresponding steps taken by the UE 3 are described e.g. with reference to FIG. 8.

In the box 37b embodiment, the eNB 2 adapts its transmission mode depending on whether or not the UE 3 supports inter-carrier measurements with a reduced number of reception elements. That is, the eNB 2 does not provide measurement gaps for inter-carrier measurements, as in the box 37a-embodiment, but instead switches between transmission modes accordingly, negotiating with the UE 3 on how many of the receive antennas and/or receiver chains are to be used for receiving measurement and/or how many to be used for receiving data. The corresponding steps taken by the UE 3 are described e.g. with reference to FIG. 9.

Figure 7:
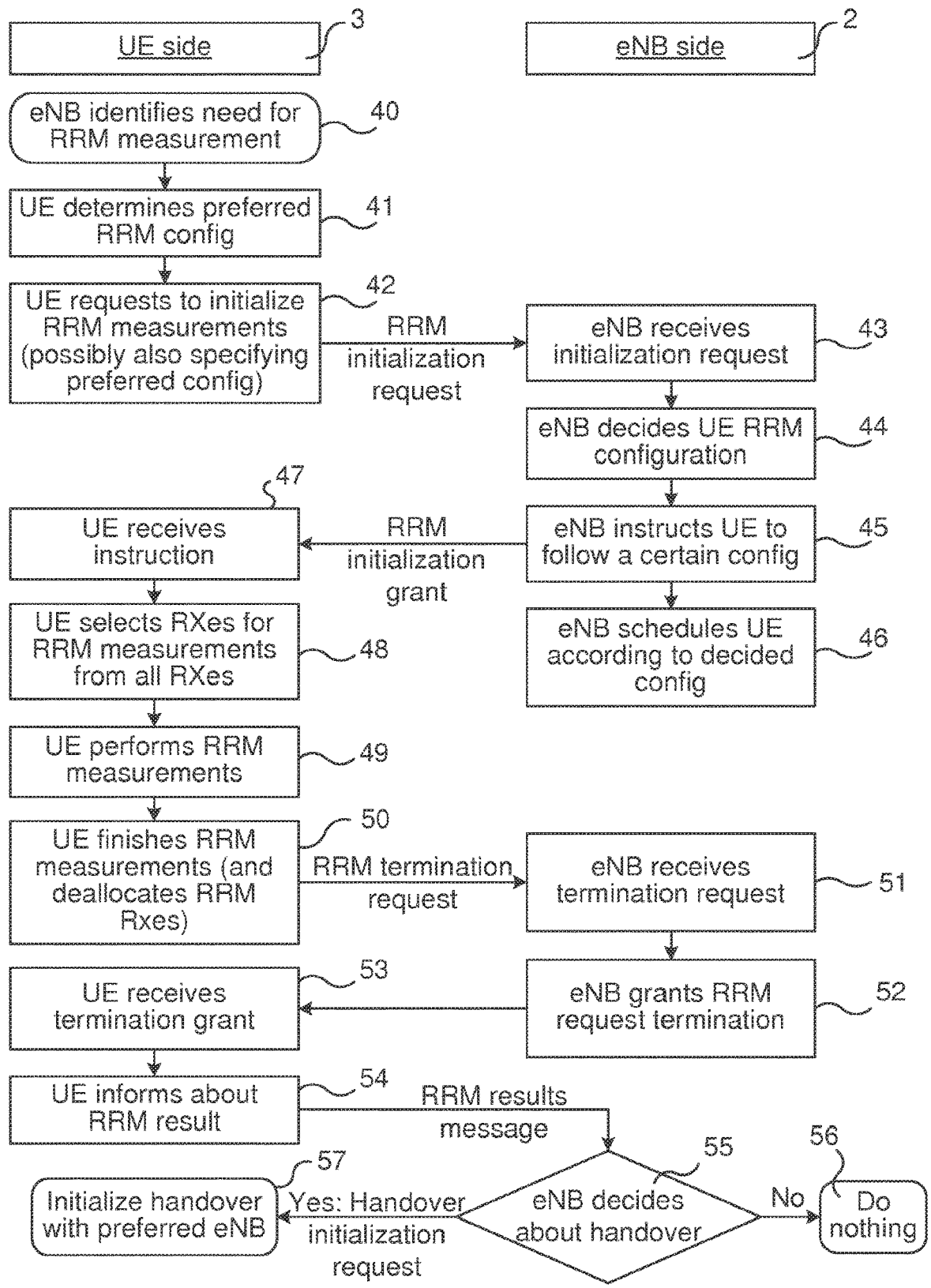
FIG. 7 is a signaling scheme illustrating signaling between a wireless device and a network node according to the present teachings.

FIG. 7 is a signaling scheme illustrating signaling between a wireless device and a network node according to the present teachings.

In box 40, the UE 3 identifies a need for RRM measurements, determines a preferred RRM configuration (box 41) and requests (box 42) to initialize RRM measurements by sending an RRM initialization request to the eNB 2. In this request, the UE 3 notifies the eNB 2 that it has a need to perform RRM measurements, and would therefore stop receiving data on some of its receive antennas and/or receiver chains currently used for receiving data, and instead use them for measurements, e.g. inter-frequency and/or inter-RAT measurements. The request may also comprise a specification on a preferred configuration. A UE 3 that is using all of its receive antennas and/or receiver chains for receiving data from its serving cell(s), may concurrently identify a need for RRM measurements. Such need may be identified e.g., by detecting a decreased quality towards of the serving cell(s). The decreased quality may be indicated, for instance, by any one or more of: reference signal received power (RSRP), reference signal received quality (RSRQ), signal to interference plus noise ratio (SINR), block error rate (BLER), bit error rate (BER), channel quality indicator (CQI), etc.

In box 43, the eNB 2 receives the initialization request, decides (box 44) RRM configuration for the UE 3 and instructs (box 45) the UE 3 to follow the decided RRM configuration by sending an RRM initialization grant to the UE 3. The eNB 2 schedules (box 46) the UE 46 according to the decided RRM configuration.

At box 47, the UE 3 receives the RRM initialization grant, selects (box 48) which receive antennas and/or receiver chains to use for the RRM measurements, and at box 49, the UE 3 performs the RRM measurements.

At box 50, when the UE 3 has finished the RRM measurements it deallocates the receive antennas and/or receiver chains used for the RRM measurements, and sends a RRM termination request to the eNB 2. At box 51, the eNB 2 thus receives the RRM termination request and terminates (box 52) the RRM session for the UE 3.

At box 53, the UE 3 receives the termination grant and then informs (box 54) the eNB 2 about the RRM measurement results by sending a RRM result message.

Based on the measurement results the eNB 2 may decide (decision box 55) whether or not a handover should be made. If, based on the measurement results, no handover is to be made, then the signaling ends (box 56). If, based on the measurement results, a handover is to be made, then the eNB 2 sends a handover initialization request to the UE 3, which (at box 57) initializes the handover procedure towards a preferred target eNB.

Figure 8:
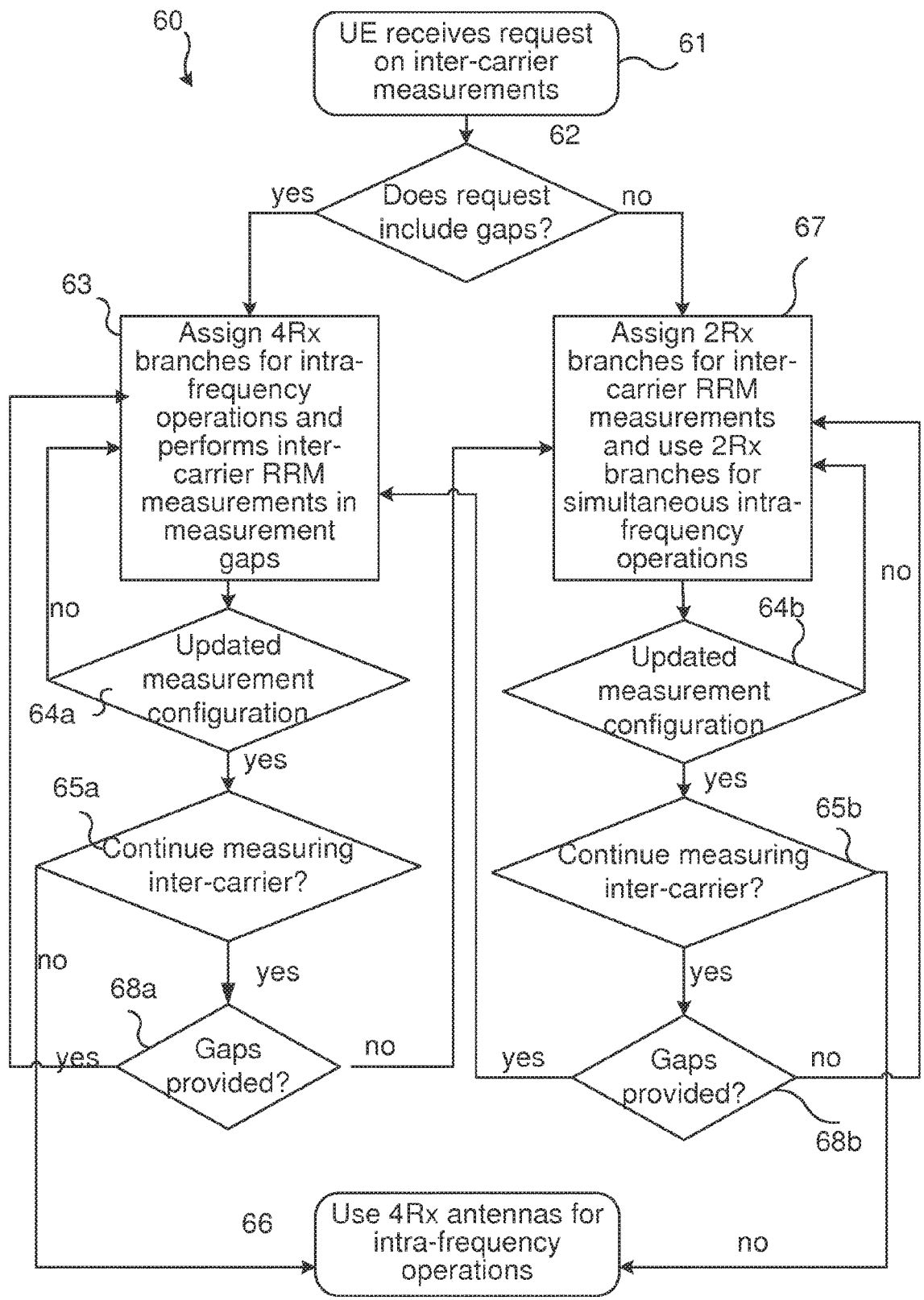
FIG. 8 is a flow chart illustrating embodiments according to the present teachings.

FIG. 8 is a flow chart illustrating embodiments according to the present teachings. When implementing, in the eNB 2, the embodiment illustrated and described with reference e.g. to FIG. 6, branch denoted 37b, the UE 3 may be configured to act according to the flow chart of FIG. 8.

In box 61 the UE 3 receives a request from the eNB 2 to perform inter-carrier measurements. Flow continues to box 62, wherein it is determined whether the request includes measurement gaps. If yes, then flow continues to box 63, wherein the UE 3 assigns all its reception means (e.g. 4 receive antennas and/or receiver chains), for intra-frequency operations and performs e.g. inter-carrier RRM measurements in the provided measurement gaps.

While performing the measurements, the UE 3 might get an updated measurement (gap) pattern (also denoted measurement configuration herein) from the eNB 2 whereby the previously provided measurement gaps of the previous measurement configuration would be removed. As long as the measurement gaps are not revoked by the eNB 2, the UE 3 continues the RRM measurements, as indicated by arrow from box 64a back to box 63. That is, if, in box 64a, no updated measurement configuration has been received, the UE 3 continues performing the measurements. It might also be (box 65a) that the updated measurement configuration no longer contains any inter-frequency or inter-RAT frequencies ("inter-carrier"), then flow continues to box 66, and the UE 3 reverts to using all 4 receive antennas and/or receiver chains for the data reception. However, if the UE 3 is still to carry out measurements on inter-frequency or inter-RAT carriers (yes in box 65a), it is checked if new measurement gap configuration is provided (box 68a). In yes, flow returns to box 63. If, in box 68a, measurement gaps are removed/withdrawn in the updated measurement configuration then, in some embodiments, the flow continues to box 67 and the UE can reassign some of the antennas and/or receiver chains for measurements to be carried out in parallel with the data reception (e.g. receiving data from the serving cell(s)).

If, in box 62, the received measurement request does not include gaps, flow continues to box 67 (described above). From box 67 flow continues to box 64b, wherein it is established if an updated measurement configuration is received, wherein measurement gaps are (again) provided for inter-frequency/inter-RAT measurements (yes in box 64b), then the UE 3 continues measuring (box 65b). If, in box 65b, no updated measurement configuration has been received, the UE 3 continues performing the measurements.

If the UE 3 is still to carry out measurements on inter-frequency or inter-RAT carriers (yes in box 65b), it is checked if new measurement gap configuration is provided (box 68b). If yes, i.e. a measurement gap configuration is provided, the UE changes mode of operation (flow continues to box 67) and receives data using all 4 receive antennas and/or receiver chains and measures in measurement gaps.

If, in box 68a, no measurement gaps are provided, and the updated measurement configuration no longer contains inter-frequency/inter-RAT carrier to measure on, the UE 3 reverts to using all 4 receive antennas and/or receiver chains for intra frequency measurements and data reception.

Figures 9, 10:
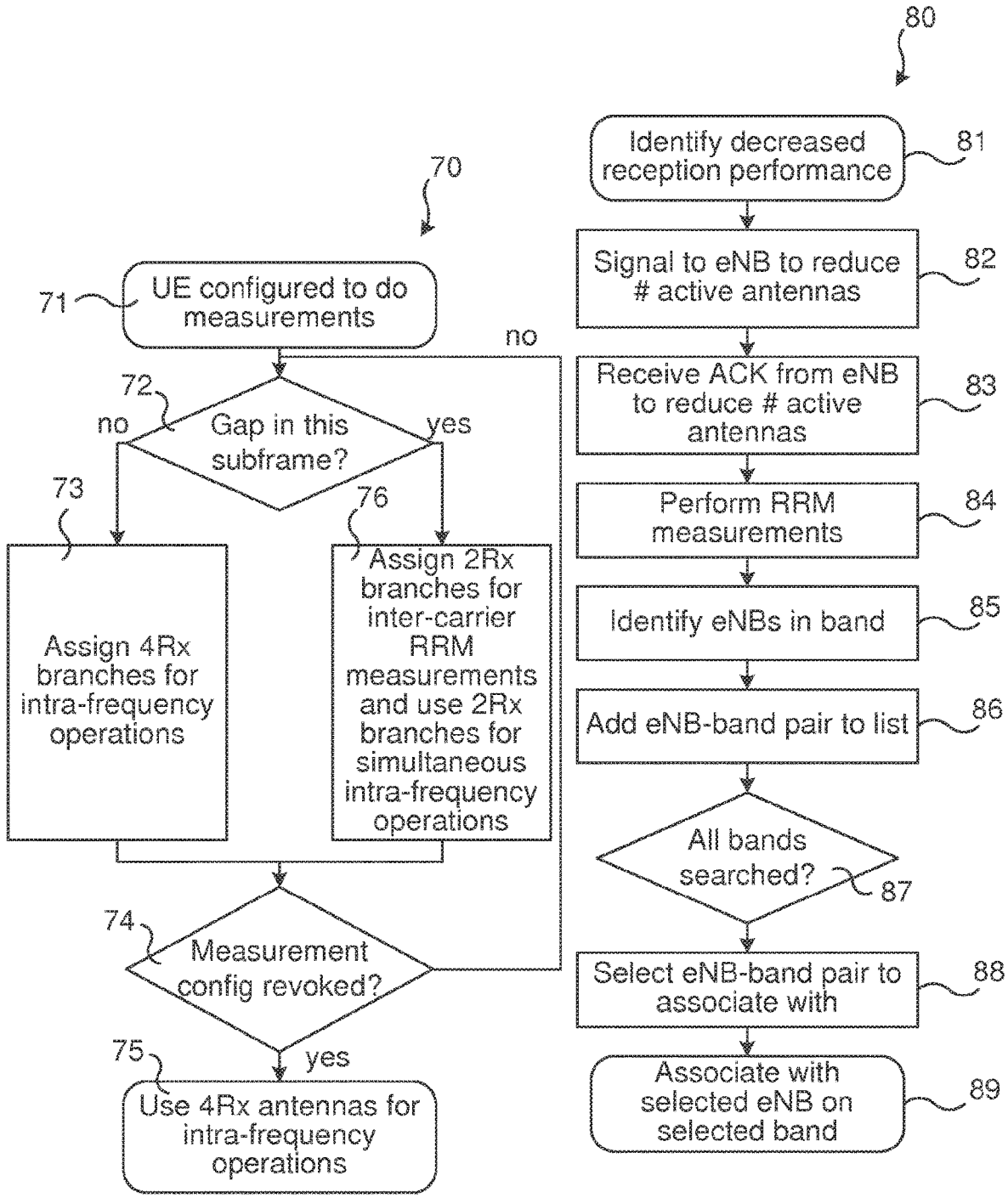
FIG. 9 is a flow chart illustrating embodiments according to the present teachings.
FIG. 10 is a flow chart illustrating embodiments according to the present teachings.

FIG. 9 is a flow chart illustrating embodiments according to the present teachings. When implementing, in the eNB 2, the embodiment illustrated and described with reference e.g. to FIG. 6, branch denoted 37a, the UE 3 may be configured to act according to the flow 70 of FIG. 9.

The UE 3 is (box 71) configured to do RRM measurements. If, in box 72, there is a gap in the current subframe (or other communication resource such as e.g. TDMA slot, TDMA radio frame, CDMA slot. CDMA radio frame, Time Division Synchronous Code Division Multiple Access (TD-SCDMA) timeslot, TD-SCDMA subframe, TD-SCDMA radio frame. OFDMA subframe, OFDMA slot, OFDMA radio frame, etc.) the UE 3 assigns part of the reception elements (e.g. 2 receiver branches) for inter-carrier RRM measurements, and another part (remaining part) of the reception elements (e.g. 2 receiver branches) for simultaneous intra-frequency operations. The eNB 2 has accepted this use of a reduced set of receive antennas and/or receiver chains for the intra-frequency operations and has adapted transmission mode accordingly, as described e.g. with reference to FIG. 6.

If, in box 72, there is no gap in the current subframe, the UE 3 assigns (box 73) all its reception elements for continued intra-frequency operations.

From boxes 73 and 76 flow continues to box 74, wherein it is established if the measurement configuration is withdrawn. Such withdrawal may be sent from the eNB 2 in RRC signaling. If yes, flow continues to box 75, wherein the UE 3 uses all its reception elements (e.g. 4 receive antennas and/or receiver chains) for the intra-frequency operations. If no, flow reverts to box 72.

FIG. 10 is a flow chart illustrating embodiments according to the present teachings. The flow 80 of FIG. 10 illustrates actions of the UE 3. At box 81, the UE 3 is receiving some service from its serving cell(s), but identifies a decreased reception performance, e.g. by establishing an increased BLER and/or by establishing a decreasing value of the mutual information, as is described later. The UE 3 then signals, to the serving eNB 2, that it wants to reduce number of reception elements (e.g. receive antennas and/or receiver chains) for receiving the service. In box 83, the UE 3 receives an acknowledgment from the eNB 2 to reduce the number of reception elements (e.g. receive antennas and/or receiver chains). The UE 3 then performs RRM measurements (box 84), identifies (box 85) candidate/target cell for cell selection (in case of forthcoming redirect from a connected mode), cell reselection (in case of UE controlled mobility) or handover (in case of network controlled mobility of UE in connected mode) on carrier and adds carrier frequency, cell identity, and timing information for such detected cells to a list (box 86). In box 87, the UE 3 establishes whether all frequency bands (of measurement configuration) have been searched, if no, flow reverts to box

84, if yes flow continues to box 88. In box 88, based on the measurements, the UE, selects or is instructed on which cells(s) to attach to. In box 89, the UE associates with the selected eNB on selected band.

Regarding the selection by the UE 3 of the receive antennas and/or receiver chains to use for RRM measurements, they may be chosen such that, provided the sensitivity of all receive antennas and/or receiver chains are equal or almost equal, the receive antennas and/or receiver chains with the best signal reception towards the serving cell, i.e., the receive antenna and/or receiver chain subset for which the mutual information, signal to interference and noise (SINR) value or a similar signal quality measure, is maximized for a given set of, rank, precoding matrices and MCS value, are kept for data reception, whereas the receive antennas and/or receiver chains with the worst signal reception towards the serving cell are selected for RRM measurements.

In cases where receive antennas and/or receiver chains with different performance exist, such that a low quality and high quality subset of antennas exist, first RRM may be performed with the low quality receive antennas and/or receiver chains in order to maintain an as high a data reception performance as possible. Second, should RRM measurements fail, instead the high quality antennas may be used for RRM measurements.

The various embodiments and features that have been described may be combined in different ways, examples of which are given in the following, with reference first to FIG. 11.

Figure 11:
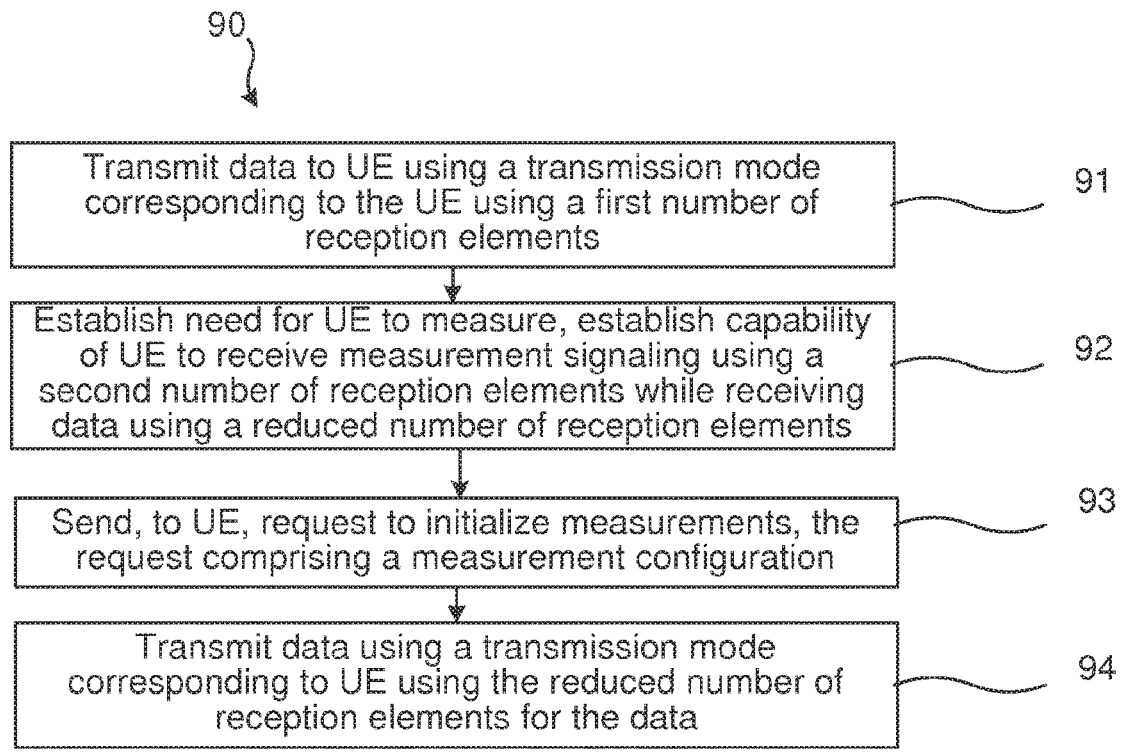
FIG. 11 illustrates a flow chart of steps of an embodiment of a method in a network node in accordance with the present teachings.

FIG. 11 illustrates a flow chart over steps of an embodiment of a method in a network node in accordance with the present teachings.

A method 90 is provided, which may be performed in a network node 2 for handling simultaneous measurement signaling and data communication with a communications device 3. The method 90 comprises transmitting 91 data to the communication device 3 using a transmission mode corresponding to the communication device 3 using a first number of reception elements 123, 125.

The method 90 comprises establishing 92 a need for the communication device 3 to perform measurements and a capability of the communication device 3 for receiving measurement signaling using a second number of reception elements 123, 125 while receiving data using a reduced number of reception elements 123, 125.

The method 90 comprises sending 93, to the communication device 3, a request to initialize the measurements, the request comprising a measurement configuration.

The method 90 comprises transmitting 94 the data using a transmission mode corresponding to the communication device 3 using the reduced number of reception elements 123, 125 for the data.

The first number of reception elements may be, and preferably is, equal to all reception elements that the communication device 3, such as a UE, comprises. This would mean that the communication device 3 is receiving data with as high throughput as possible. When a need for performing measurements is established this first number of reception elements will then need to be reduced, since some of the reception elements are needed for the reception of measurements. How many to use for which signaling may be negotiated between the network node 2 and the communication device 3. This may be seen as a dynamic partitioning of reception elements, which may be negotiated.

In another embodiment, the communication device 3 is receiving data using less than its total number of reception elements, i.e. the first number of reception means does not include all of its reception elements. When a need for performing measurements is established, the remaining reception elements may be used for this.

The number of reception elements is divided, equally or non-equally, between the reception of data signaling (from serving cell) and, upon need, reception of measurements (from other cells and/or serving cell).

It is noted that the sending of the request to initialize the measurements and defining the number of reception elements may be sent as one message or as two separate messages.

In an embodiment, the request further comprises a measurement pattern defining communication resources during which the communication device 3 should use the reduced number of reception elements 123, 125 for the data and/or defining communication resources during which the communication device 3 should use the first number of reception elements 123, 125 for the data, and the transmitting 94 comprises adapting the transmission mode accordingly. For instance, and as described earlier, if the first number of reception elements is the full set of reception elements that the communications device has, then the network node may use a transmission mode that requires this full set of reception elements, e.g. 4 DL reception antennas, when, according to measurement pattern the communications device is receiving only data. When the communication device is using some of these reception elements 123, 125 for receiving measurements, the network node adapts transmission mode accordingly.

In an embodiment, the establishing 92 the capability comprises receiving, from the communication device 3, a request for using the reduced number of reception elements 123, 125 for receiving the data.

In an embodiment, the establishing 92 the capability comprises receiving, from the communication device 3, a capability report indicating capability of receiving measurement signaling using a second number of reception elements 123, 125 while receiving data using a reduced number of reception elements 123, 125.

In an embodiment, the establishing 92 a need for the communication device 3 to perform the measurements comprises receiving a request from the communication device 3 for performing the measurements or identifying in the network node 2 the need for the communication device 3 to perform the measurements.

In various embodiments, the measurements configuration comprises radio resource management related measurements, inter-carrier measurements or inter-radio access technology measurements.

Figure 12:
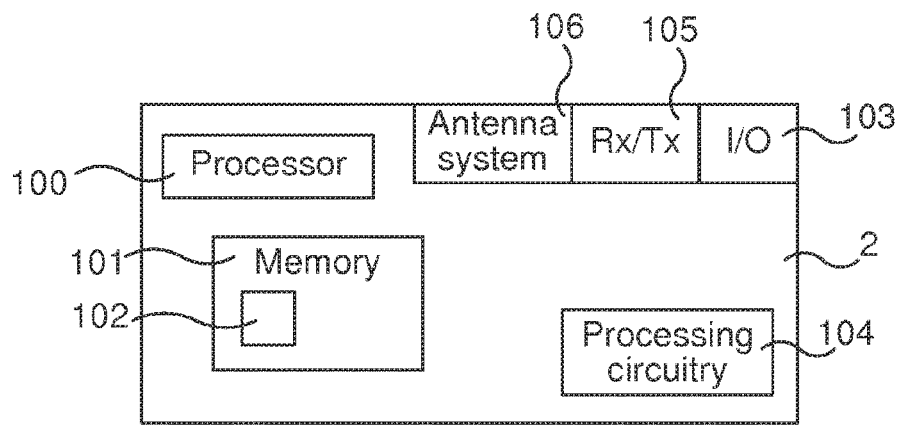
FIG. 12 illustrates schematically a network node and means for implementing embodiments of the method in accordance with the present teachings.

FIG. 12 illustrates schematically a network node and means for implementing embodiments of the method in accordance with the present teachings.

The network node 2 comprises one or more processors or control units 100 comprising any combination of one or more of a central processing unit (CPU), multiprocessor, microcontroller, digital signal processor (DSP), application specific integrated circuit etc. capable of executing software instructions stored in a memory 101 which can thus be a computer program product 101. The processor 100 can be configured to execute any of the various embodiments of the method for instance as described in relation to FIG. 11.

The memory 101 can be any combination of read and write memory (RAM) and read only memory (ROM), Flash memory, magnetic tape, Compact Disc (CD)-ROM, digital versatile disc (DVD), Blu-ray disc etc. The memory 101 may also comprise persistent storage, which, for example, can be any single one or combination of magnetic memory, optical memory, solid state memory or even remotely mounted memory.

The network node 2 may comprise or control an antenna system 106 comprising e.g. antenna elements, transmitting circuitry, reception circuitry. The network node 2 may thus comprise any receiver (Rx) and transmitter (Tx) circuitry and various conventionally used components for wireless transmission over a radio interface, indicated collectively at reference numeral 105.

The network node 2 also comprises an input/output device 103 (indicated by I/O in FIG. 12) for communicating with other entities, e.g. with other network nodes. Such input/output device 103 of the network node 2 may comprise a communication interface and/or cables interconnecting the nodes.

The network node 2 may also comprise additional processing circuitry, schematically indicated at reference numeral 104, for implementing the various embodiments according to the present teachings.

The present teachings provide computer programs 102 for the network node 2. The computer programs 102 comprises computer program code, which, when executed on at least one processor 100 on the network node 2 causes the network node 2 to perform the method 90 according to any of the described embodiments thereof.

The present disclosure also encompasses computer program products 101 comprising a computer program 102 for implementing the embodiments of the method as described, and a computer readable means on which the computer program 102 is stored. The computer program product 101 may, as mentioned earlier, be any combination of random access memory (RAM) or read only memory (ROM), Flash memory, magnetic tape, Compact Disc (CD)-ROM, digital versatile disc (DVD), Blu-ray disc etc.

A network node 2 is provided for handling simultaneous measurement signaling and data communication with a communications device 3. The network node 2 is configured to:
transmit data to the communication device 3 using a transmission mode corresponding to the communication device 3 using a first number of reception elements 123, 125,
establish a need for the communication device 3 to perform measurements and a capability of the communication device 3 for receiving measurement signaling using a second number of reception elements 123, 125 while receiving data using a reduced number of reception elements 123, 125,
send, to the communication device 3, a request to initialize the measurements, the request comprising a measurement configuration, and
transmit the data using a transmission mode corresponding to the communication device 3 using the reduced number of reception elements 123, 125 for the data.

The network node 2 may be configured to perform the above steps e.g. by comprising one or more processors 30 and memory 101, the memory 101 containing instructions executable by the processor 100, whereby the network node 2 is operative to perform the steps. In case of several processors 100 (not illustrated), they may be configured to perform all steps of the method 90 or only part of the steps.

In an embodiment, the request further comprises a measurement pattern defining communication resources during which the communication device 3 should use the reduced number of reception elements 123, 125 for the data and/or defining communication resources during which the communication device 3 should use the first number of reception elements 123, 125 for the data, and wherein the network node 2 is configured to transmit by adapting the transmission mode accordingly.

In an embodiment, the network node 2 is configured to establish the capability by receiving, from the communication device 3, a request for using the reduced number of reception elements 123, 125 for receiving the data.

In an embodiment, the network node 2 is configured to establish the capability by receiving, from the communication device 3, a capability report indicating capability of receiving measurement signaling using a second number of reception elements 123, 125 while receiving data using a reduced number of reception elements 123, 125.

In an embodiment, the network node 2 is configured to establish a need for the communication device 3 to perform the measurements by receiving a request from the communication device 3 for performing the measurements or identifying in the network node 2 the need for the communication device 3 to perform the measurements.

In various embodiments, the measurements configuration comprises radio resource management related measurements, inter-carrier measurements or inter-radio access technology measurements.

In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A network node is provided for handling simultaneous measurement signaling and data communication with a communications device.

The network node comprises a first unit for transmitting data to the communication device using a transmission mode corresponding to the communication device using a first number of reception elements. Such first unit may for instance comprise a radio interface (e.g. units 105, 106 and/or 104 described with reference to FIG. 12) and/or processing circuitry for transmitting.

The network node comprises a second unit for establishing a need for the communication device to perform measurements and a capability of the communication device for receiving measurement signaling using a second number of reception elements while receiving data using a reduced number of reception elements. Such second unit may comprise various processing circuitry. e.g. processing circuitry (e.g. units 100 and/or 104 described with reference to FIG. 12) adapted to establish such need by using program code stored in memory.

The network node comprises a third unit for sending, to the communication device, a request to initialize the measurements, the request comprising a measurement configuration. Such third unit may for instance comprise a radio interface (e.g. units 105, 106 and/or 104 described with reference to FIG. 12) and/or processing circuitry for transmitting.

The network node comprises a fourth unit for transmitting the data using a transmission mode corresponding to the communication device using the reduced number of reception elements for the data.

Figure 13:
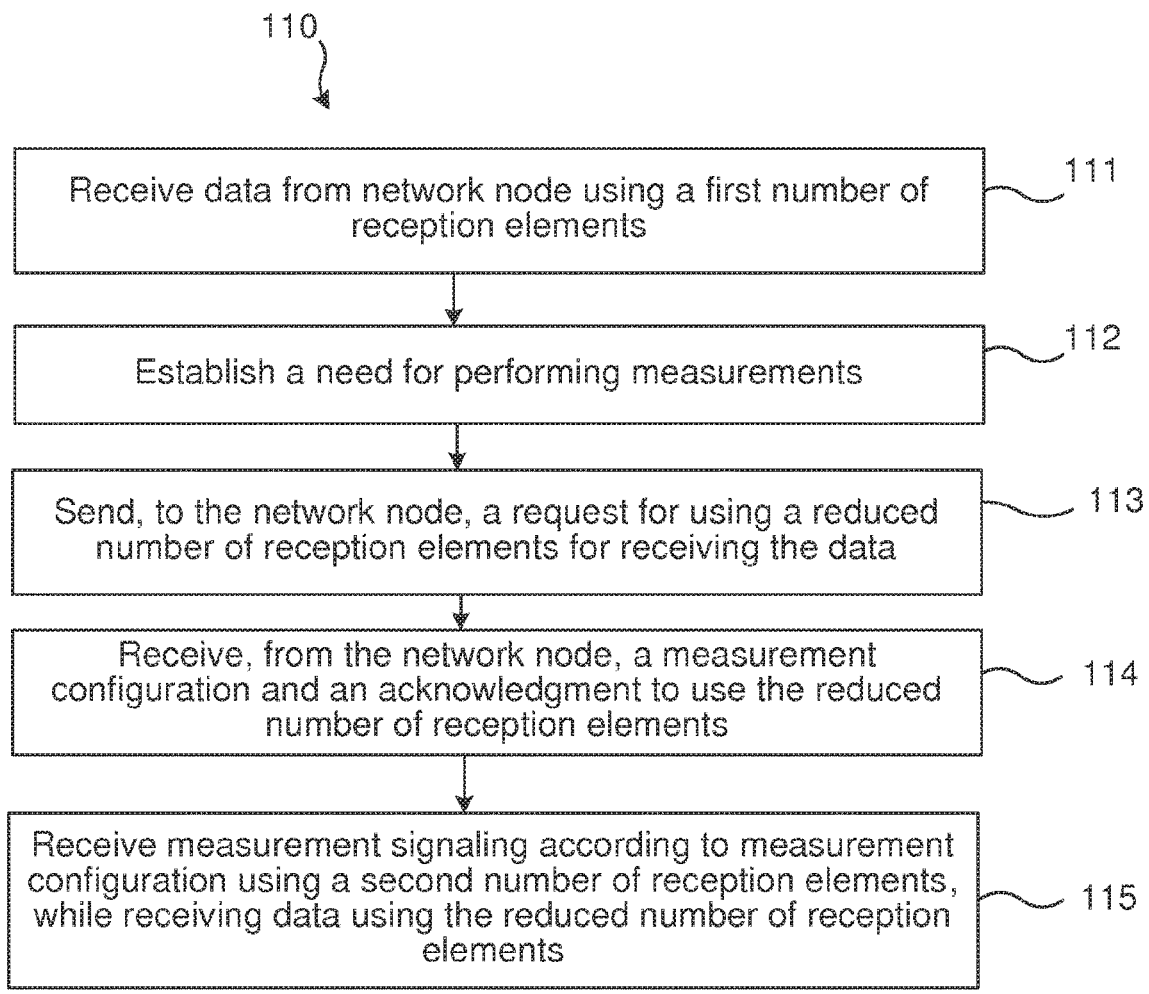
FIG. 13 illustrates a flow chart of steps of an embodiment of a method in a wireless device in accordance with the present teachings.

FIG. 13 illustrates a flow chart over steps of an embodiment of a method in a communication device in accordance with the present teachings. The method 110 may be performed in a communication device 3, e.g. a UE, for simultaneous measurement signaling and data signaling with a network node 2. The method 110 comprises receiving 111 data from the network node 2 using a first number of reception elements 123, 125.

The method 110 comprises establishing 112 a need for performing measurements.

The method 110 comprises sending 113, to the network node 2, 5 a request for using a reduced number of reception elements 123, 125 for receiving the data.

The method 110 comprises receiving 114 from the network node 2, 5 a measurement configuration and an acknowledgment to use the reduced number of reception elements 123, 125.

The method 110 comprises receiving 115 measurement signaling according to the measurement configuration using a second number of reception elements 123, 125, while receiving the data using the reduced number of reception elements 123, 125.

In variations of the above embodiment, the measurement configuration comprises a measurement pattern defining communication resources during which to use the reduced number of reception elements 123, 125 for receiving the data and/or defining communication resources during which to use the first number of reception elements 123, 125 for receiving the data, and wherein the receiving 113 comprises adapting the number of reception elements 123, 125 accordingly.

In various embodiments, the establishing 112 a need for performing measurements comprises detecting a decreased reception performance of the data.

In an embodiment, the first number of reception elements 123, 125 comprises a first set of reception elements comprising all reception elements of the communication device 3 and wherein the reduced number of reception elements comprises a first subset of the reception elements of the first set and the second number of reception elements comprises a second subset comprising the remaining reception elements of the first set not included in the first subset.

In a variation of the above embodiment, the method 110 comprises selecting the first subset of reception elements 123, 125 to include the reception elements 123, 125 among the first set of reception elements 123, 125 currently having highest mutual information. It is noted that the selection on which reception elements to use may be made in different ways.

Figure 14:
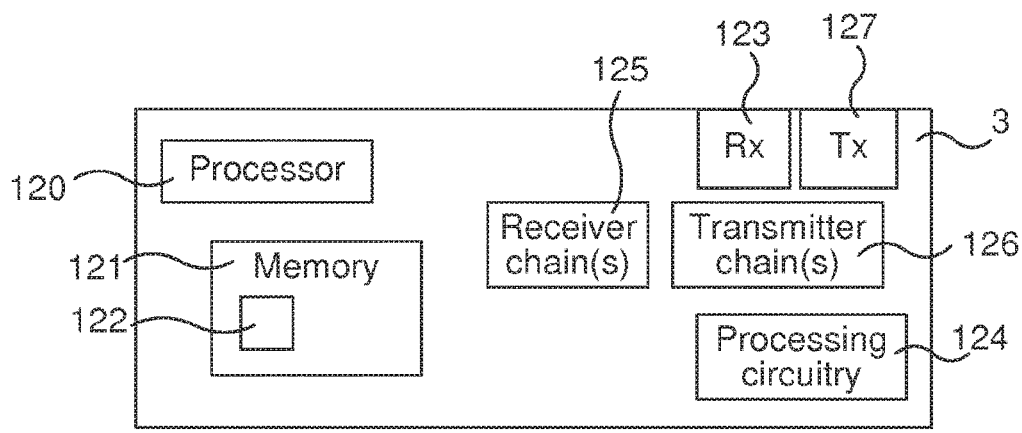
FIG. 14 illustrates schematically a wireless device and means for implementing embodiments of the method in accordance with the present teachings.

FIG. 14 illustrates schematically a communication device and means for implementing embodiments of the method in accordance with the present teachings.

The communication device 3 comprises one or more a processors or control unit(s) 120 comprising any combination of one or more of a central processing unit (CPU), multiprocessor, microcontroller, digital signal processor (DSP), application specific integrated circuit etc. capable of executing software instructions stored in one or more memories 121 (only one illustrated) which can be a computer program product 121. The processor 120 can be configured to execute any of the various embodiments of the method for instance as described in relation to FIG. 13, or parts of the steps of the method.

The memory 121 can be any combination of read and write memory (RAM) and read only memory (ROM), Flash memory, magnetic tape, Compact Disc (CD)-ROM, digital versatile disc (DVD), Blu-ray disc etc. The memory 121 may also comprise persistent storage, which, for example, can be any single one or combination of magnetic memory, optical memory, solid state memory or even remotely mounted memory.

The communication device 3 may also comprise additional processing circuitry, schematically indicated at reference numeral 124, for implementing the various embodiments according to the present teachings.

The communication device 3 comprises reception elements 123, 125. Such reception elements may for instance comprise a number of receiver antennas 123 (indicated by "Rx" in the FIG. 14) and a number of receiver chains 125. For the present teachings, the number of receiver antennas 123 should be at least two, but any number is conceivable, e.g. 4 receiver antennas or 6 or 8 or even more receiver antennas. The receiver chains 125, correspondingly two or more, may comprise conventional components such as digital processor, analog-to-digital converters, various filters, amplifiers, up-converters, down-converters etc., e.g. for frequency conversion, filtering, gain control, baseband processing etc. As a note on vocabulary, the antenna or antenna pair may be part of the receiver chain.

The communication device 3 also comprises one or more transmission elements 126, 127. In correspondence with the reception elements, the transmission elements may comprise a number of transmitter antennas 127, typically only one, but more are conceivable, and transmitter chains 126, typically only one. Such transmitter chain may comprise conventional components such as digital processor, digital-to-analog converters, various filters, amplifiers, up-converters, down-converters etc.

The present teachings provide computer program 122 for the communication device 3. The computer program 122 comprises computer program code, which, when executed on at least one processor 120 on the communication device 3 causes the communication device 3 to perform the method 110 according to any of the described embodiments thereof.

The present disclosure also encompasses computer program products 121 comprising a computer program 122 for implementing the embodiments of the method as described, and a computer readable means on which the computer program 122 is stored. The computer program product 121 may, as mentioned earlier, be any combination of random access memory (RAM) or read only memory (ROM), Flash memory, magnetic tape, Compact Disc (CD)-ROM, digital versatile disc (DVD), Blu-ray disc etc.

A communication device 3 for simultaneous measurement signaling and data communication with a network node 2 is provided. The communication device 3 is configured to:
- receive data from the network node 2 using a first number of reception elements 123, 125,
- establish a need for performing measurements,
- send, to the network node 2, 5 a request for using a reduced number of reception elements 123, 125 for receiving the data,
- receive from the network node 2, 5 a measurement configuration and an acknowledgment to use the reduced number of reception elements 123, 125, and
- receive measurements according to the measurement configuration using a second number of reception elements 123, 125, while receiving the data using the reduced number of reception elements 123, 125.

The communication device 3 may be configured to perform the above steps e.g. by comprising one or more processors 120 and memory 121, the memory 121 containing instructions executable by the processor 120, whereby the communication device 3 is operative to perform the steps. In case of several processors 120 (not illustrated), they may be configured to perform all steps of the method 110 or only part of the steps.

In an embodiment, the measurement configuration comprises a measurement pattern defining communication resources during which to use the reduced number of reception elements 123, 125 for receiving the data and/or defining communication resources during which to use the first number of reception elements 123, 125 for receiving the data, and the communication device 3 is configured to receive by adapting the number of reception elements 123, 125 accordingly.

In various embodiments, the communication device 3 is configured to establish a need for performing measurements by detecting a decreased reception performance of the data.

In various embodiments, the first number of reception elements 123, 125 comprises a first set of reception elements comprising all reception elements of the communication device 3 and wherein the reduced number of reception elements comprises a first subset of the reception elements of the first set and the second number of reception elements comprises a second subset comprising the remaining reception elements of the first set not included in the first subset.

In an embodiment, the communication device 3 is configured to select the first subset of reception elements 123, 125 to include the reception elements 123, 125 among the first set of reception elements 123, 125 currently having highest mutual information.

In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A communication device is provided for handling simultaneous measurement signaling and data communication with a network node.

The communication device comprises a first unit for receiving data from the network node using a first number of reception elements. Such first unit may for instance comprise a radio interface and/or processing circuitry for receiving (e.g. units 123 and/or 125 described with reference to FIG. 14).

The communication device comprises a second unit for establishing a need for performing measurements. Such second unit may comprise various processing circuitry (e.g. units 120 and/or 124 described with reference to FIG. 14), e.g. processing circuitry adapted to establish such need by using program code stored in memory.

The communication device comprises a third unit for sending, to the network node a request for using a reduced number of reception elements for receiving the data. Such third unit may for instance comprise a radio interface and/or processing circuitry for transmitting (e.g. units 123 and/or 126 described with reference to FIG. 14).

The communication device comprises a fourth unit for receiving from the network node a measurement configuration and an acknowledgment to use the reduced number of reception elements. Such fourth unit may for instance comprise a radio interface and/or processing circuitry for receiving (e.g. units 123 and/or 125 described with reference to FIG. 14).

The communication device comprises a fifth unit for receiving measurement signaling according to the measurement configuration using a second number of reception elements, while receiving the data using the reduced number of reception elements. Such fifth unit may for instance comprise a radio interface and/or processing circuitry for receiving (e.g. units 123 and/or 125 described with reference to FIG. 14).

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network node for handling simultaneous measurement signaling and data communication with a communications device, the method comprising:
    transmitting data for the communication device using a transmission mode corresponding to the communication device using a first number of reception elements for data reception with respect to the network node;
    establishing a need for the communication device to perform measurements, and a capability of the communication device for receiving measurement signaling using a second number of reception elements while using a reduced number of reception elements for data reception with respect to the network node, wherein the second number of reception elements is reallocated from the first number of reception elements, such that the reduced number of reception elements is a remaining number of reception elements;
    sending, to the communication device, a request to initialize the measurements, the request comprising a measurement configuration; and
    transmitting data for the communication device using a transmission mode corresponding to the communication device using the reduced number of reception elements for data reception with respect to the network node.

2. The method as claimed in claim 1, wherein the request further comprises a measurement pattern defining communication resources during which the communication device should use the reduced number of reception elements for data reception with respect to the network node, or defining communication resources during which the communication device should use the first number of reception elements for data reception with respect to the network node, and wherein the transmitting comprises adapting the transmission mode accordingly.

3. The method as claimed in claim 1, wherein establishing the capability comprises receiving, from the communication device, a request for using the reduced number of reception elements for data reception with respect to the network node.

4. The method as claimed in claim 1, wherein establishing the capability comprises receiving, from the communication device, a capability report indicating capability of receiving measurement signaling using the second number of reception elements while receiving data using the reduced number of reception elements.

5. The method as claimed in claim 1, wherein establishing the need for the communication device to perform the measurements comprises receiving a request from the communication device for performing the measurements or identifying in the network node the need for the communication device to perform the measurements.

6. The method as claimed in claim 1, wherein the measurements configuration comprises radio resource management related measurements, inter-carrier measurements or inter-radio access technology measurements.

7. A network node configured for handling simultaneous measurement signaling and data communication with a communications device, the network node comprising:
    communication circuitry configured for communicating with the communication device; and processing circuitry operatively associated with the communication circuitry and configured to:
  transmit data for the communication device using a transmission mode corresponding to the communication device using a first number of reception elements for data reception with respect to the network node;
  establish a need for the communication device to perform measurements, and a capability of the communication device for receiving measurement signaling using a second number of reception elements while receiving data using a reduced number of reception elements, wherein the second number of reception elements is reallocated from the first number of reception elements, such that the reduced number of reception elements is a remaining number of reception elements;
  send, to the communication device, a request to initialize the measurements, the request comprising a measurement configuration; and
  transmit data for the communication device using a transmission mode corresponding to the communication device using the reduced number of reception elements for data reception with respect to the network node.

8. The network node as claimed in claim 7, wherein the request further comprises a measurement pattern defining communication resources during which the communication device should use the reduced number of reception elements for data reception with respect to the network node, or defining communication resources during which the communication device should use the first number of reception elements for data reception with respect to the network node, and wherein the processing circuitry is configured to transmit by adapting the transmission mode accordingly.

9. The network node as claimed in claim 7, wherein the processing circuitry is configured to establish the capability by receiving, from the communication device, a request for using the reduced number of reception elements for data reception with respect to the network node.

10. The network node as claimed in claim 7, wherein the processing circuitry is configured to establish the capability by receiving, from the communication device, a capability report indicating capability of receiving measurement signaling using the second number of reception elements while receiving data using the reduced number of reception elements.

11. The network node as claimed in claim 7, wherein the processing circuitry is configured to establish the need for the communication device to perform the measurements by receiving a request from the communication device for performing the measurements or identifying in the network node the need for the communication device to perform the measurements.

12. The network node as claimed in claim 7, wherein the measurements configuration comprises radio resource management related measurements, inter-carrier measurements or inter-radio access technology measurements.

13. A method performed in a communication device for simultaneous measurement signaling and data signaling with a network node, the method comprising:
  using a first number of reception elements for data reception with respect to the network node;
  establishing a need for performing measurements;
  sending, to the network node, a request for using a reduced number of reception elements for data reception with respect to the network node;
  receiving, from the network node, a measurement configuration and an acknowledgment to use the reduced number of reception elements; and
  receiving measurement signaling according to the measurement configuration, using a second number of reception elements while using the reduced number of reception elements for data reception with respect to the network node, wherein the second number of reception elements is reallocated from the first number of reception elements, such that the reduced number of reception elements is a remaining number of reception elements.

14. The method as claimed in claim 13, wherein the measurement configuration comprises a measurement pattern defining communication resources during which the communication device uses the reduced number of reception elements for data reception with respect to the network node, or defining communication resources during which the communication device uses the first number of reception elements for data reception with respect to the network node, and wherein the receiving comprises adapting the number of reception elements accordingly.

15. The method as claimed in claim 13, wherein establishing the need for performing measurements comprises detecting a decreased reception performance at the communication device with respect to the network node.

16. The method as claimed in claim 13, wherein the first number of reception elements comprises a first set of reception elements comprising all reception elements of the communication device, and wherein the reduced number of reception elements comprises a first subset of the reception elements of the first set, and the second number of reception elements comprises a second subset comprising the remaining reception elements of the first set not included in the first subset.

17. The method as claimed in claim 16, further comprising selecting the first subset of reception elements to include reception elements among the first set of reception elements currently having highest mutual information.

18. A communication device configured for simultaneous measurement signaling and data signaling with a network node, the communication device comprising:
  communication circuitry configured for communicating with the network node; and
  processing circuitry operatively associated with the communication circuitry and configured to:
    use a first number of reception elements for data reception with respect to the network node;
    establish a need for performing measurements;
    send, to the network node a request for using a reduced number of reception elements for data reception with respect to the network node;
    receive from the network node a measurement configuration and an acknowledgment to use the reduced number of reception elements; and
    receive measurements according to the measurement configuration using a second number of reception elements while using the reduced number of reception elements for data reception with respect to the network node, wherein the second number of reception elements is reallocated from the first number of reception elements, such that the reduced number of reception elements is a remaining number of reception elements.

19. The communication device as claimed in claim 18, wherein the measurement configuration comprises a measurement pattern defining communication resources during which the communication device uses the reduced number of reception elements for data reception with respect to the network node, or defining communication resources during which the communication device uses the first number of reception elements for data reception with respect to the network node, and the processing circuitry is configured to adapt the number of reception elements used by the communication device for data reception with respect to the network node accordingly.

20. The communication device as claimed in claim 18, wherein the processing circuitry is configured to establish the need for performing measurements by detecting a decreased reception performance at the communication device with respect to the network node.

21. The communication device as claimed in claim 19, wherein the first number of reception elements comprises a first set of reception elements comprising all reception elements of the communication device, and wherein the reduced number of reception elements comprises a first subset of the reception elements of the first set, and the second number of reception elements comprises a second subset comprising the remaining reception elements of the first set not included in the first subset.

22. The communication device as claimed in claim 21, wherein the processing circuitry is configured to select the first subset of reception elements to include reception elements among the first set of reception elements currently having highest mutual information.

23. A network node configured for operation in a communication network, the network node comprising:
communication circuitry configured for transmission of a carrier operative as a serving carrier for a communication device; and
processing circuitry operatively associated with the communication circuitry and configured to:
determine a measurement configuration for the communication device, the measurement configuration defining one or more times during which the communication device is to perform Radio Resource Management (RRM) measurements based on temporarily dividing a set of reception elements allocated at the communication device for data reception on the serving carrier into a first subset that remains allocated for data reception on the serving carrier and a second subset that is temporarily reallocated for performing the RRM measurements;
transmit signaling for the communication device, indicating the measurement configuration; and
with respect to the network node performing data transmissions for the communication device on the serving carrier, adapt a transmission mode used by the network node, to account for the communication device using, during the one or more times, a reduced number of reception elements for data reception on the serving carrier.

24. A communication device configured for operation in a communication network, the communication device comprising:
communication circuitry configured to receive data transmissions and control signaling on a serving carrier provided by a network node of the communication network, the communication circuitry comprising a plurality of reception elements; and
processing circuitry operatively associated with the communication circuitry and configured to:
receive signaling from the network node, the signaling indicating a measurement configuration defining one or more times during which the communication device is to perform Radio Resource Management (RRM) measurements; and
for each of the one or more times:
temporarily divide a set of reception elements allocated for data reception on the serving carrier, the set comprising all or some of the plurality of reception elements and being divided into a first subset that remains allocated for data reception on the serving carrier and a second subset that is temporarily reallocated for performing the RRM measurements;
support data reception on the serving carrier using the first subset;
perform the RRM measurements using the second subset; and
revert the second subset to supporting data reception on the serving carrier, responsive to termination of the RRM measurements.

* * * * *